United States Patent [19]

Jacoby et al.

[11] Patent Number: 4,975,469
[45] Date of Patent: Dec. 4, 1990

[54] ORIENTED POROUS POLYPROPYLENE FILMS

[75] Inventors: Philip Jacoby, Naperville; Charles W. Bauer, Batavia, both of Ill.

[73] Assignee: Amoco Corporation, Chicago, Ill.

[21] Appl. No.: 325,680

[22] Filed: Mar. 20, 1989

[51] Int. Cl.[5] ............................................. C08J 9/26
[52] U.S. Cl. .................................... 521/84.1; 521/90; 521/128; 521/143
[58] Field of Search ....................... 521/90, 143, 84.1; 523/128

[56] References Cited

U.S. PATENT DOCUMENTS

| | | | |
|---|---|---|---|
| 3,055,966 | 12/1962 | Sandberg | 521/143 |
| 3,376,238 | 4/1968 | Gregorian et al. | 260/2.5 |
| 3,407,253 | 10/1968 | Yoshimura et al. | 264/289 |
| 3,426,754 | 2/1969 | Bierenbaum et al. | 128/156 |
| 3,539,374 | 11/1970 | Isaacson | 117/7 |
| 3,551,361 | 12/1970 | Needham | 521/84.1 |
| 3,551,363 | 12/1970 | Brody | 260/2.5 |
| 3,558,374 | 1/1971 | Boss et al. | 148/174 |
| 3,607,793 | 9/1971 | Mahlman | 260/2.5 M |
| 3,690,977 | 9/1972 | Loft et al. | 156/167 |
| 3,725,520 | 4/1973 | Suzuki et al. | 264/41 |
| 3,801,404 | 4/1974 | Druin et al. | 156/229 |
| 3,839,240 | 10/1974 | Zimmerman | 260/2.5 H A |
| 3,839,516 | 10/1974 | Williams et al. | 264/41 |
| 3,843,761 | 10/1974 | Bierenbaum et al. | 264/210 R |
| 3,844,865 | 10/1974 | Elton et al. | 156/229 |
| 3,907,726 | 9/1975 | Tomiyama | 523/128 |
| 3,920,785 | 11/1975 | Druin et al. | 264/210 R |
| 3,956,020 | 5/1976 | Weininger et al. | 136/146 |
| 3,969,562 | 7/1976 | Suzuki | 428/155 |
| 4,076,656 | 2/1978 | White et al. | 260/2.5 M |
| 4,100,238 | 7/1978 | Shinomura | 264/49 |
| 4,105,737 | 8/1978 | Suzuki | 264/154 |
| 4,116,892 | 9/1978 | Schwarz | 521/62 |
| 4,138,459 | 2/1979 | Brazinsky et al. | 264/154 |
| 4,153,751 | 5/1979 | Schwarz | 428/304 |
| 4,185,148 | 1/1980 | Sato et al. | 526/348.1 |
| 4,197,148 | 4/1980 | Shinomura | 156/79 |
| 4,289,832 | 9/1981 | Schwarz | 428/542 |
| 4,386,129 | 5/1983 | Jacoby | 428/215 |
| 4,705,813 | 11/1987 | Ito et al. | 521/92 |

FOREIGN PATENT DOCUMENTS

| | | |
|---|---|---|
| 0256192 | 2/1988 | European Pat. Off. . |
| 0258002 | 3/1988 | European Pat. Off. . |
| 0273582 | 7/1988 | European Pat. Off. . |
| 52-21530 | 6/1977 | Japan . |

OTHER PUBLICATIONS

H. J. Leugering, et al., "Influencing of the Crystal Structure of Isotactic Polypropylene by Crystallization from Oriented Melts" (Translation) Die Angew–Makro Chem. 33,17 (1973).
H. Dragaun, et al., "Shear-Induced $\beta$-Form Crystallization in Isotactic Polypropylene", J. Polym. Sci, 15, 1779 (1977).
A. J. Lovinger, et al., "Studies on the $\alpha$ and $\beta$ Forms of Isotactic Polypropylene by Crystallization in a Temperature Gradient." J. Polym. Sci, 15, 641 (1977).
A. A. Duswalt et al., "Thermal Study of $\beta$-Form Polypropylene" Amer. Chem. Soc. Div. Org. Coat. 30, No. 2,93 (1970).
H. J. Leugering, "Einflub der Kristallstruktur und der Uberstruktur auf einige Eigenschaffen von Polypropylene" Makromol. Chem. 109, 204 (1967).
A Turner Jones, et al. "Crystalline Forms of Isotactic Polypropylene" Makromol. Chem. 75, 193–158 (1964).
Kirk–Othmer Encyclopedia of Chem. Tech., 3rd Edition, vol. 10, p. 232–245.
Preliminary Data Sheet, Albis Ecostar ® Masterbatch PE–Starch MB 70/43/6. ALBIS Corporation. Toronto, Canada.

Primary Examiner—Veronica P. Hoke
Attorney, Agent, or Firm—Robert G. Ladd; William H. Magidson; Ralph C. Medhurst

[57] ABSTRACT

This invention relates to oriented porous films having cells with polygonal cross sections and average pore diameters of about 5 to about 30 microns and interconnecting pores between the cells which have a diameter of about 0.2 to about 20 microns which are formed from a polypropylene-based resin and a process for forming the film which comprises the steps of forming a film containing beta-spherulites, selectively extracting a portion of the beta-spherulites to form a porous film and stretching the porous film in at least one direction to form the oriented polymeric porous film.

17 Claims, 1 Drawing Sheet

ORIENTED POROUS POLYPROPYLENE FILMS

FIELD OF THE INVENTION

This invention relates to an oriented polymeric porous film formed from a polypropylene-based resin and having a moisture vapor transmission rate as determined according to ASTM E-96, procedure E, in the range of about 2500 to about 7500 grams per square meter per 24 hours and to a process for forming the film.

BACKGROUND OF THE INVENTION

Commonly assigned U.S. Pat. No. 4,386,129 describes a porous polymeric film having pores with polygonal cross sections and average pore diameters of about 3 to about 100 microns formed from a resinous polymer of propylene and the process for forming the films comprising the steps of forming a film containing beta-spherulites and selectively extracting the beta-spherulites. Such films have utility as filtration devices, raincoats, and tents. As contemplated by the patent, such films also can be subjected to post-processing steps such as calendering, lamination, or stretching, to improve or modify properties such as strength, thereby expanding their potential utility. For example, as with nonporous polypropylene films, stretching of such porous films in their longitudinal or transverse directions, or both, can be conducted to strength the films due orientation of polymer molecules. However, the fine interconnected pore structure of the porous films is susceptible to distortion on stretching such that desirable properties, such as waterproofness, may be sacrificed. As can be appreciated, it would be desirable to obtain the benefits of stretching in terms of increased breathability, higher tensile strength, improved drapability while maintaining a suitable combination of waterproofness, porosity and pore structure in the stretched films.

Various porous stretched polymeric films are known in the art. There are three categories of technology to produce porous, melt processed polymeric films in which a stretching step is involved. These three categories are processes for stretching films of neat, unblended polymers that do not contain fillers, other than typical stabilizing additives; processes for making films from blends of two or more polymers, or from a blend of a polymer with mineral oil or an organic salt in which the dispersed phase may be extracted with the film stretched either before or after the extraction; and processes for producing films made from a polymer that has been blended with a filler such as calcium carbonate or barium sulfate with the film stretched after casting without any extraction.

In the first category, a common method of producing such films involves drawing or stretching a crystalline, elastic starting film to about 10 to 300 percent of its original length as exemplified by U.S. Pat. Nos. 3,426,754; 3,558,374; 3,539,374; 3,551,363; 3,690,977; 3,801,404; 3,843,761; 3,839,240; and 4,138,459. This drawing operation is said to produce a microporous film ordinarily having elongated, slit-like pores with a pore size less than 0.5 micron although U.S. pat. No. 3,839,240 discloses a process for producing pores as large as 1.2 microns. U.S. Pat. No. 3,920,785 describes post-treating a stretched film with an organic solvent to increase the gas transmission rate of the film. U.S. Pat. No. 4,105,737 describes a process for producing a porous film by forming many fine cracks in a stretchable polymer composition having a fine phase separation structure, heating the polymer composition to its stretching temperature under tension so that the fine cracks do not disappear and enlarging the cracks by stretching the film at the stretching temperature. U.S. Pat. No. 3,839,516 describes a process for swelling a polyolefin film by immersing the film in a solvent such as toluene or benzene, stretching the polyolefin film in the swollen state and drying the film under tension to form pores. EP No. 0 256 192 describes a process for preparing a sheet of sintered polymer particles and then stretching this sheet on a tentering device to create a liquid permeable lace-like structure.

In the second category, U.S. Pat. No. 3,956,020 describes a process for dissolving a benzoate salt from a polymer article to form an ultrafine porous article, U.S. Pat. No. 4,076,656 describes a process to incorporate a water soluble liquid into a polymer and to extract the liquid with water, and in U.S. Pat. No. 3,607,793, a hydrocarbon liquid is extracted from a polymeric gel. U.S. Pat. No. 3,407,253 describes a process to form sheets from blends of polypropylene and an elastomer such as polyisobutylene which are drawn to create internal voids, thereby imparting some breathability. U.S. Pat. No. 3,969,562 describes a process of blending two crystalline polymers together, extruding a sheet, cold stretching the sheet to open up crazes and then hot stretching the sheet biaxially to increase porosity. U.S. Pat. Nos. 4,100,238 and 4,197,148 describe processes for blending two partially compatible polymers together, forming a sheet or film from the blend, immersing the film in a solvent for one of the components and extracting the component, drying the resulting film which has an interpenetrating pore structure to remove the solvent and biaxially stretching the film. According to the patents, the resultant material has a very high moisture vapor transmission rate and is not waterproof. U.S. Pat. Nos. 4,116,892, 4,153,751 and 4,289,832 describe a process to extrude incompatible polymer blends into a sheet and then stretching the sheet by drawing it over a grooved roller at low temperatures to generate porosity. EP No. 0 273 582A describes a process in which polypropylene is blended with mineral oil and a nucleating agent and a cast film is produced from the blend. The mineral oil phase separates as droplets within the polypropylene matrix and the droplets are removed by running the film through an extraction bath. The nucleating agent is said to act to reduce the size of the droplets and thereby reduce the size of the holes in the final product. The patent also mentions that the extracted film may be biaxially stretched although no description is given regarding the moisture vapor transmission rate of the resulting material. EP No. 0 258 002A describes a process in which a hydrophobic polymer such as polyethylene is blended with a hydrophilic polymer such as polyethylene oxide and a blown film is produced from the blend, the polyethylene oxide is crosslinked with UV radiation with uncrosslinked polyethylene oxide extracted with water, the film dried to produce a film containing pores filled by interconnecting plugs of polyethylene oxide. According to this publication, the moisture vapor transmission rates of the formed materials are typically 10,000 grams per square meter per 24 hours or greater.

In the third category, U.S. Pat. No. 3,844,865 describes a process in which blends of a polymer with an inorganic salt such as calcium carbonate are formed into films and then stretched uniaxially or biaxially to obtain high moisture vapor transmission rates. U.S. Pat. No. 3,376,238 describes a process in which blends of polyethylene with sugar, starch, and silica gel are prepared and cast into film with the film crosslinked with peroxide or radiation and then pore formers are extracted at elevated temperatures with the films optionally biaxially stretched before the extraction step. U.S. Pat. No. 3,725,520 describes a process to blend a polyolefin with a hard filler and a high boiling solvent which is formed into a sheet and the sheet is biaxially stretched with the solvent evaporated before or after the stretching. U.S. Pat. No. 4,705,813 describes a process to blend a polyolefin with barium sulfate and optionally a lubricant, cast the blend into a film and stretching the film uniaxially or biaxially.

Also of possible interest in connection with the present invention, U.S. Pat. No. 4,185,148 describes a process for producing a polypropylene film having a surface layer of beta-form crystals. In that process the film is extruded through a thermal gradient such that one side of the film cools at a much more rapid rate than the other thereby producing beta-crystals on the cooled side. The resulting film is then biaxially stretched to produce a film having a rough surface and which is air-tight. The patent discloses that unstretched polypropylene film which is prepared by melt-molding a resin containing beta-form crystallization nucleating agent, having beta-form crystal structure is stretched, a film having roughened uneven patterns on the film surface may be obtained.

While various stretched or stretched, porous films are disclosed in the patents and publications discussed above, none discloses or suggests stretching of porous polymeric films prepared by forming a film containing beta-spherulites and selectively extracting the beta-spherulites, to provide an oriented porous film with desirable increases in porosity, nor do they disclose or suggest porous films containing up to 20 weight percent cornstarch to enhance biodegradability and photodegradability properties.

An object of the instant invention is to provide a process for preparing oriented porous films of resinous polymers of propylene.

Another object of the instant invention is to provide a process for forming oriented films of polypropylene-based resin having cells with polygonal cross-sections which are about 5 to about 30 microns in diameter and interconnecting pores between the cells which are about 0.2 to about 20 microns in diameter.

Another object of the instant invention is to provide oriented polymeric porous films of polypropylene-based polymer with a thickness of about 0.005 to about 0.2 millimeters having cells of polygonal cross-section with average diameters of about 5 to about 30 microns and interconnecting pores between the cells which are about 0.2 to about 20 microns in diameter.

Another object of the instant invention is to improve biodegradability and photodegradability of polymeric porous films of polypropylene-based resin.

We have now found that the objects of this invention can be obtained by stretching in at least one direction to about 1.5 to about 7.5 times its original length in such direction and under controlled stretching conditions, a porous film comprising a polypropylene-based resin and having a moisture vapor transmission rate (MVTR) of about 2,500 to about 7,500 grams/square meter/24 hours and having cells with polygonal cross-sections which are about 5 to about 30 microns in diameter and interconnecting pores between the cells which are about 0.2 to about 20 microns in diameter. Advantageously, the resulting films exhibit improved strength relative to the unstretched film and, in addition, have cell and pore structures and porosity such that a MVTR of about 2,500 to about 7,500 grams per square meter per day are obtained. Further, stretching according to the present invention allows for preparation of films of desirable porosity and MVTR from unstretched films which themselves can be obtained under simplified extraction conditions, thereby improving efficiency of the overall process. In a particular embodiment, biodegradability and photodegradability of the films is enhanced by incorporation of cornstarch into the film.

SUMMARY OF THE INVENTION

This invention relates to oriented polymeric porous films and to a method for preparing these films. More particularly this invention relates to an oriented polymeric porous film formed from a polypropylene-based resin having a moisture vapor transmission rate as determined according to ASTM E-96, procedure E, in the range of about 2,500 to about 7,500 grams per square meter in 24 hours and to a process for forming the film comprising the steps of forming a film containing beta-spherulites, selectively extracting the beta-spherulites corresponding to about 15 or greater weight percent of the film and orienting the porous film by heating the porous film at a temperature of about 115° to about 135° C. for a time period of about 2 to about 20 seconds and stretching the heated porous film in at least one direction at a stretch ratio of about 1.5 to about 7.5 to form the oriented polymeric porous film.

DESCRIPTION OF THE INVENTION

Figure 1:
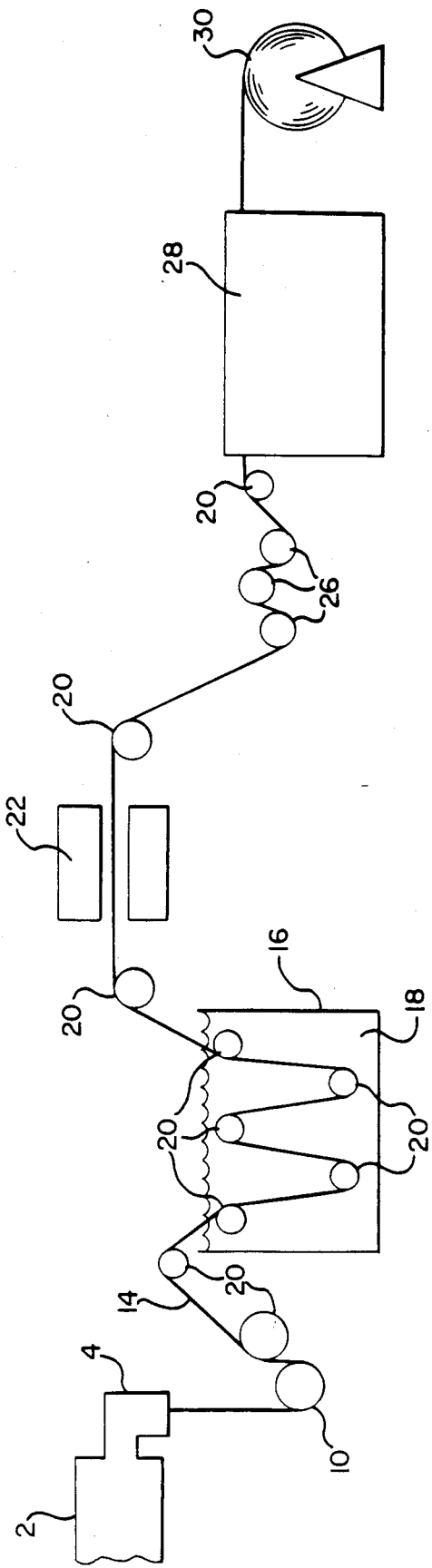
FIG. 1 is a schematic diagram showing the process for producing the oriented porous film of the invention.

The polypropylene-based resins useful in the instant invention are capable of having at least 40% crystallinity and typically at least 50% crystallinity as determined by x-ray diffraction analysis. Suitable polypropylene-based resins include not only propylene homopolymers but also copolymers of propylene containing up to about 20 mol percent of another alpha-olefin or mixtures of alpha-olefins. Also, blends of propylene homopolymers with other polyolefins such as high density polyethylene, low density polyethylene, linear low density polyethylene, polybutylene and ethylene-propylene copolymers can be used. The propylene-based resin may have any degree of polymerization so long as it is capable of being melt-extruded to form a film, although it is preferable that it have a melt flow rate of about 0.5 to 20 g/10 min as measured at 230° C. under a load of 2.16 kg as specified as ASTM D1238-70. Polypropylene-based resins having melt flow rates outside this range typically do not produce acceptable films Several procedures are known for preferentially inducing the formation of the beta-form spherulites. H. J. Leugering et al. (Die Angew. Makro. Chem. 33, 17 (1973)) and H. Dragaun et al. (J. Polym. Sci., 15, 1779 (1977)) disclose the formation by crystallizing from a melt undergoing shear deformation. A. J. Lovinger et al. (J. Polym. Sci., 15, 641 (1977) disclose the formation of beta-form by zone-crystallization in a temperature gradient. H. J. Leugering (Makromol. Chem. 109, 204

(1967)) and A. Duswalt et al. (Amer. Chem. Soc. Div. Org. Coat., 30, No. 2 93 (1970)) disclose the use of certain nucleating agents to cause the preferential formation of beta-form spherulites.

In the practice of the instant invention, it is preferred that nucleating agents be used to produce the beta-form spherulites. The use of nucleating agents provides the beta-form spherulites in a more controlled distribution and size than the other hereinabove described methods. In order to obtain a final porous film in which the pores are well distributed and of the desired size, it is critical that the distribution and size of the beta-form spherulites are controlled.

As discussed by Duswalt et al., only a few materials are known to preferentially nucleate beta-form spherulites. These known beta-nucleators include (a) the gamma-crystalline form of a quinacridone colorant Permanent Red E3B having the structural formula

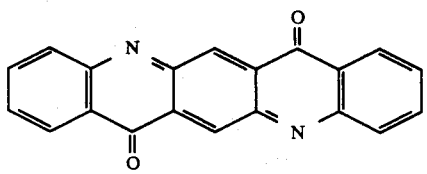

herein referred to as "Q-dye";
(b) the bisodium salt of o-phthalic acid;
(c) the aluminum salt of 6-quinizarin sulfonic acid; and to a lesser degree
(d) isophthalic and terephthalic acids. The preferred beta-nucleant in the instant invention is Q-dye.

The amount of nucleant which is useful in the instant invention depends on the effectiveness of the particular nucleant in inducing beta-crystals and the amount of porosity desired in the film product. Other things being equal, as the level of nucleant is increased the amount of beta-crystallinity increases resulting in larger pore size and increased pore volume upon extraction. The amount of Q-dye useful in the process of the instant invention ranges from about 0.01 to about 100 ppm by weight of Q-dye per weight of base resin. The term "base resin" is used herein to mean the crystalline polypropylene-based resin together with any additives such as u.v. stabilizers, antioxidants, halide scavenger, colorants, and fillers which might be utilized. Preferably, about 0.1 to about 10 ppm by weight of Q-dye per weight of base resin is utilized. Other things being equal, less than about 0.01 ppm of Q-dye per weight of base resin has a negligible effect on the level of beta-form present in the film and amounts greater than 10 ppm do not significantly increase the amount of beta-spherulites formed. Preferably, sufficient nucleating agent is used to produce 20 weight percent or more of beta-spherulites in the film.

The nucleating agents are ordinarily used in the form of powdered solids. To efficiently produce beta-crystallites the powder particles should be less than 5 microns in diameter and preferably no greater than 1 micron in diameter. Mixtures of inorganic materials such as calcium carbonate, barium sulfate, sodium chloride and the like with Q-dye can also be used.

The nucleant can be dispersed in the base resin by any of the procedures normally used in the polymer art to thoroughly mix a powder in a polymeric resin. For example, the nucleant can be powder blended with base resin powder or pellets. The nucleant can be slurried in an inert medium and the slurry used to impregnate base resin powder or pellets. Alternatively, mixing at elevated temperatures can be accomplished using, for example, a roll mill or multiple passes through an extruder. A preferred mixing procedure is to powder blend nucleant with base resin pellets or powder and this mixture is melt compounded in an extruder. Multiple passes may be necessary to give the desired level of dispersion of the nucleant. Ordinarily this procedure would be used to form a masterbatch of pelletized resin containing sufficient nucleant so that when blended with base resin the desired level of nucleant is obtained in the final product.

In one embodiment of the invention, cornstarch is added to the polypropylene-based resin to obtain enhanced biodegradability and photodegradability. Cornstarch can be blended with the nucleated polypropylene-based resin prior to casting the resin into a film. The cornstarch does not alter the biological inertness of the polypropylene, but it does offer a means by which the film matrix can "bio-disintegrate" in the environment when the starch component is attached by micro organisms.

Generally any suitable starch can be employed according to the present invention, i.e. cornstarch by itself or as concentrates which may contain other additives such as polymeric dispersing aids, degradants, etc. Other possible starches include rice starch with an average grain size of 5 microns and potato starch having an average grain size of of 80 microns. Preferably, cornstarch in a concentrate is the starch used in the present invention.

An example of a cornstarch preferred in the instant invention is that made by St. Lawrence Ltd. of Canada and available as a pure powder in the form of a pelletized concentrate of 43 percent cornstarch in linear low density polyethylene also containing an autoxidisable addition to assist biodegradation on burial or submersion. The pellitized concentrate is identified as ALBIS ECOSTAR TM Masterbatch PE-Starch MB 70/43/6. From about 2 to about 20 percent cornstarch can be used in the instant invention with about 5 to about 15 percent of cornstarch based on the weight of the polypropylene-based resin being the preferred amount. The cornstarch preferably has an average grain size of about 15 microns.

Extracted films of polypropylene-based resins containing nucleant and starch typically are opaque with a light tan color. Compared to the starch-free films used according to the instant invention, the starch filled films typically exhibit higher levels of extraction at lower temperatures. The starch filled film, preferably are extracted at temperatures up to about 91° C. because higher temperatures promote loss of film integrity in the extraction bath.

The base resin containing the beta-nucleant can be formed into a film by any of the processes known in the film forming art which are suitable for use with crystalline polypropylene. A number of film-forming processes are described in the Kirk-Othmer Encyclopedia of Chemical Technology, third edition, volume 10, pages 232–245, which is incorporated herein by reference. Of the known processes, melt-forming processes are of particular utility with the slot-die extrusion and blown-bubble extrusion processes being preferred.

A critical parameter in the formation of a film containing beta-spherulites is the rate at which the molten resin is cooled after it is formed into a film. Other things being equal, the more rapid the cooling the smaller the size of the beta-spherulites which are formed. If the molten film is cooled too rapidly, it is possible that essentially no spherulites be formed. Conversely, the slower the molten resinous film is cooled the larger the size of the spherulites which form. It has been reported by Duswalt et al. (supra) and A. Turner Jones et al. (Markromol Chem., 75, 134-158 (1964)) that beta-spherulites are formed at crystallization temperatures between about 80° C. and 130° C. with the optimum range being about 100° C. to about 125° C. Little or no beta-spherulites are formed below about 80° C. or above about 130° C. Duswalt et al. also reported the effect of cooling rate on the amount of beta-spherulites formed at different levels of nucleant. The optimum cooling rate was reported to be about 5° C. to about 40° C. per minute with significant amounts of beta-spherulites produced at a cooling rate of 80° C. per minute at nucleant concentrations of about 0.1 to about 10 ppm nucleant per weight of base resin.

In the blown-bubble process, the film is preferably cooled with a stream of air. In the slot-die extrusion process, the cooling can be accomplished with a liquid cooling bath, chill roll or stream of air. The chill roll is commonly used for the cast film process. The cooling conditions needed to achieve the desired beta-spherulite size can be controlled using one or more of the following parameters: polymer melt temperature; extrusion rate; drawdown ratio; die gap (in extruded film); cooling air velocity and temperature (in blown film); and chill roll temperature (in cast film). Other things being equal, an increase in one of the following of these parameters results in a decrease in the rate the molten film is quenched (cooled) and consequently an increase in the size of the beta-spherulites formed; polymer melt temperature; extrusion rate; die gap; cooling air temperature; or chill roll temperature. Conversely, other things being equal, a decrease in one of these variables results in a decrease in the size of the beta-spherulites. By contrast, an increase in either the drawdown ratio or cooling air velocity results in an increase in the quench rate and an associated decrease in the size of beta-spherulites if other things are equal.

The film of the instant invention is ordinarily thicker than about 0.005 millimeters. The useful maximum thickness depends on the time of extraction of the beta-spherulites. Other things being equal, the thicker the film the longer the time required to extract a given percentage of the total beta-spherulites present. Preferably the thickness of oriented films produced by the instant invention ranges from about 0.005 millimeters to about 0.2 millimeters in thickness. The unstretched porous films range in thickness from about 0.01 to about 0.4 millimeters.

The beta-spherulites can be extracted with nonpolar, organic solvents. For ease of operation in the process of the instant invention, it is preferred that the extracting medium have a boiling point greater than about 100° C. It is possible to utilize mixtures of two or more organic solvents and in such an event the lower boiling solvent should have a boiling point greater than about 100° C. Preferred extracting materials include toluene, carbon tetrachloride, and xylene with toluene being most preferred.

The extraction conditions are critical in selectively removing at least a portion of the beta-spherulites while minimizing the amount of alpha-form crystalline polypropylene removed. Removal of the beta-form crystals is very temperature dependent. If the extraction temperature is too low, the beta-spherulites are removed too slowly or not at all. When the extraction temperature is too high, alpha-form crystals are dissolved along with the beta-form. The optimum temperature of extraction depends on the particular extraction medium used and can be readily determined by one skilled in the art. For the preferred extracting medium, toluene, the extraction is preferably accomplished in the temperature range of about 85° C. to about 95° C., most preferably about 88° C. to about 93° C. For films containing cornstarch, lower extraction temperatures are required in the range of 80° C. to about 95° C. with the preferred range being about 85° C. to about 90° C.

As expected, there is a relationship between the extraction temperature and the extraction time. The extraction time is used herein to mean the time the film contacts the extracting medium at the extraction temperature. Other things being equal, the higher the extraction temperature the shorter the extraction time; conversely, the lower the extraction temperature the longer the film must be contacted with the extraction medium to remove a given amount of beat-spherulites. The length of the extraction time can be used to control the degree of porosity to some extent since at a given extraction temperature greater quantities of the beta-spherulites can remain in the film as the extraction time is decreased. It is preferred that at least 15 percent of the beta-spherulites are extracted as measured by weight loss of extracted film. The extraction time also depends on the thickness of the film being extracted. At a given temperature, the extraction time increases as the film becomes thicker. Ordinarily the extraction time ranges from about 1.5 to about 20 minutes. Preferably, the extraction time is 10 minutes or less. The optimum extraction time for a particular film thickness, beta-form content and extraction temperature can be readily determined by a person skilled in the polymer fabrication art.

The shape and location of the beta-spherulites present in the film determines the shape and location of the cells and pores which are produced by extraction as discussed hereinabove. Since the spacial form of the beta-spherulites has a polygonal cross-section, the cells and pores formed by the instant process have the shape of plane figures bounded by straight lines. The term "polygonal pores" is used herein to mean pores which have cross-sections which can be described as polygons.

As discussed in more detail hereinbelow, the pore size, pore size distribution, and pore volume are determined for purposes of this application by mercury intrusion porosimetry. The term "pore size" is used herein as an equivalent to the term "average pore diameter." The mercury porosimetry results show that for the extracted, but unoriented films the average pore diameter is typically in the range of 0.2 to 0.8 microns, and that more than 90% of the pores fall in the range of 0.05 to 5 microns. For the extracted film that has been biaxially oriented by at least a 2:1 stretch ratio, the average pore diameter is typically in the range of 0.1 to 50 microns, and that more than 90% of the pores fall in the range of 0.2 to 20 microns. The diameters of the cells that remain after the extraction of the beta-spherulites can be measured by using a ruler on photomicrographs obtained via the scanning electron microscope. These measurements are more subjective in that the distance across the pore is measured at several points and averaged and also the number of pores which can be observed is a small fraction of the total number of pores. This type of measurement, however, indicates that the range of cell diameters is about 3 to about 100 microns with more than 75 percent of the cells having openings with average diameters in the range of 5 to 30 microns.

The extracted, porous film can be stretched uniaxially or biaxially. Uniaxial stretching methods include rolls and a roll or tenter for restraining the film. Biaxial stretching methods include successive biaxially stretching comprising longitudinal stretching by rolls and transverse stretching by a tenter and simultaneous biaxial stretching using a tenter. Successive biaxial stretching using rolls and a tenter is preferably used. For biaxial stretching, the stretch ratio in the longitudinal or machine direction and transverse direction may be the same or different. Preferably, the stretch ratios are the same in both directions. The stretch ratios can be about 1.5 to about 7.5. Preferred stretch ratios for biaxial stretching are about 2 to about 5 and for uniaxial stretching about 2 to about 6.

With reference to FIG. 1, a mixture of a base resin, a nucleant and optionally a starch is formed into a melt in extruder 2. The melt temperature is in the range of about 180° C. to about 270° C., preferably about 200° C. to about 240° C. The melt is fed into a slot die 4 from which the melt is extruded as a film. Commonly, the slot die opening ranges from about 0.25 to about 1.2 millimeters. As the extruded film emerges from the die and starts to cool, it contacts a chill roll 10 and is cooled further by chill roll 10 maintained at a temperature of about 80° to about 130° C. The polymer melt temperature, extrusion rate, drawdown ratio, slot die opening and chill roll temperature can be used to control the rate of cooling the film and thereby the size of the beta-spherulites as discussed hereinabove.

The flat film 14 passes into an extraction vessel 16 which contains the non-polar solvent 18 used to selectively extract the beta-crystallites. A series of rollers 20 are used to maintain tension in the film. The extraction vessel 16 can be equipped with a heating means (not shown), such as steam traced lines or the extraction vessel 16 can be immersed in a temperature controlled silicone oil bath, capable of maintaining the extraction solvent at the preferred extraction temperature. Any commercially available controlling means can be employed to control the temperature of the extracting solvent preferably to within 0.5° C. The extraction vessel 16 can also be equipped with a means (not shown) for introducing fresh extracting solvent into the vessel and removing spent solvent containing dissolved resin from the vessel. The spent solvent can be passed into a recovery section (not shown) where the solvent can be separated from the dissolved resin, for example, by flashing the solvent and condensing the vapor. The recovered polymer containing nucleant can be blended in appropriate amounts with fresh base resin and used to produce film.

The extracted film is transported through a drying station 22 to remove any extraction solvent which remains with the film. The drying station can be any means commonly used in the art to remove materials such as extraction solvents. Devices such as radiant heaters can be employed with the preferred drying method utilizing a blower for impinging heated air on the film.

With both the drying station and the extraction vessel, environmental procedures involved in handling extraction solvent can be utilized. It is preferred that both the extraction vessel 16 and the drying station 22 be contained by a housing equipped with the necessary exhaust and volatile treatment facilities to minimize loss of the extraction solvent to the environment.

The dried film is heated by heating rolls 26 to a temperature of about 115° C. to about 135° C. for about 2 to about 20 seconds before being oriented on a tenter stretcher 28. The stretching can be uniaxial or biaxial at stretch ratios of about 1.5 to about 7.5.

The oriented porous film is wound onto a take-up roll 30.

In a particular embodiment, the process steps for producing an oriented polymeric porous film of the instant invention are as follows:
  (a) Forming a homogeneous blend of a polypropylene-based resin, about 0.5 to about 10 ppm of a red quinacridone dye acting as a beta-spherulite nucleant and optionally a starch-containing material;
  (b) Extruding the blend into a film having a thickness of about 0.01 to about 0.4 millimeters and at least 20 percent beta-spherulites on a cast film line having a chill roll temperature of about 90 to about 130° C.;
  (c) Extracting beta-spherulites corresponding to at least 15 weight percent of the blend from the cast film by immersing the cast film in a toluene bath at a temperature of about 85° to about 95° C. for a time period of 10 minutes or less to form a porous film;
  (d) Drying the porous film at a temperature of about 15° to about 110° C. for 20 minutes or less;
  (e) Orienting the porous film by heating the porous film at a temperature of about 115° to about 135° C. for a time period of about 2 to about 20 seconds and stretching the heated porous film in at least one direction at a stretch ratio of about 1.5 to about 7.5 to form the oriented polymeric porous film.

The oriented porous film or sheet obtained by the instant invention can find application in the apparel, membrane and ultrafiltration areas.

In the apparel area, applications include apparel linings, rainwear, sportswear such as jogging suits, tents, sleeping bags, protective clothing and as laminates on other fabrics.

Applications in the membrane and ultrafiltration area include battery separators, reverse osmosis supports and house wrap.

The stretched porous film of the instant invention containing starch can be used in disposable applications such as diapers and agricultural mulch film. A preferred mulch film according to the invention incorporates about 5 to about 15 weight percent cornstarch in the mulch film. For agricultural mulch film, the starch-containing porous film can be impregnated with pesticides and/or fertilizers which release over the growing season. With the porous film of the instant invention containing starch, photodegradability and biodegradability of the film allows the film to be sufficiently degraded so that the film can be plowed under at the end of the growing season without costly removal and disposal.

The invention described herein is illustrated, but not limited, by the following Examples.

EXAMPLE I

The polypropylene resin used was a homopolymer powder from Amoco Chemical Company which had a melt flow rate of about 3.2 g/10 min. as determined by ASTM test D1238-70. A masterbatch of quinacridone dye with polypropylene was prepared by adding 0.2 gram of quinacridone dye to 1000 gram of the polypropylene powder described above. The masterbatch was homogenized by manual agitation in a plastic bag followed by roll-blending of the masterbatch mixture in a large jar for 30 minutes. Of the masterbatch containing 200 ppm of the quinacridone dye, 17.5 grams were added to 1982.5 grams of the polypropylene powder described above together with the following additives: 0.04 weight percent calcium stearate, 0.07 weight percent tetrakis(methylene (3,5-di-tert-butyl-4-hydroxyhydrocinnamate))methane and 0.07 weight percent tetrakis(2,4-di-tert-butylphenyl) 4,4'-biphenylene diphosphonite. This blend of material was homogenized in the same manner as the masterbatch material. The homogenized blend was then melt compounded in a ¾ inch Brabender extruder at a melt temperature of 219 ° C. The resulting blend contained 1.75 ppm of Q-dye in the base resin.

A film was prepared from the blend containing 1.75 ppm Q-dye by using a ¾" Brabender-Type 2325 extruder having a 6 inch wide slot die. The extruder was operated at a screw rotation of 50 rpm and had four temperature zones maintained at 215°, 220°, 215° and 219° C., respectively. At the exit of the die, three 4" diameter chrome plate chill rolls obtained from C. W. Brabender, Inc. were used to condition the nucleated film as it exited the extruder. Chill rolls 1 and 3 were heated by a 50/50 mixture of water and ethylene glycol maintained at a temperature of 100.9° C. in a fluid bath. Chill roll 2 was heated by a 50/50 mixture of water and ethylene glycol maintained at a temperature of 104.5° C. in a separate fluid bath. The resulting film was wound on a take-up roll.

Sample A was prepared by taking a weighed section of the film prepared as described above and by clamping the film in a 4" diameter wooden embroidery hoop. The hoop was used to constrain the film because the film expands in toluene and shrinks during drying. The film/hoop assembly was immersed in a toluene bath maintained at 90° C. for 1.5 minutes, removed from the bath and allowed to dry. The film was quite baggy upon removal from the toluene bath, but during drying it shrank and became taut on the hoop. After the film was completely dry it was removed from the hoop and weighed. The % weight loss of the film was noted.

Sample B was prepared in a manner similar to Sample A with an extraction temperature of 90° C. and an extraction time of 4.0 minutes.

Sample C was prepared in a manner similar to Sample A with an extraction temperature of 90° C. and an extraction time of 8.0 minutes.

Sample D was prepared by taking a 2"×2" piece of film from a film prepared in a manner similar to Sample A with an extraction temperature of 91° C. and an extraction time of 1.5 minutes and inserting the 2"×2" piece of film into the open clamp of a T. M. Long Stretcher and pneumatically closing the clamps. A hot air blower set at a temperature of 260° C. and a heated plate below the film set at 220° F. were used to heat the film for about 5 seconds and then the clamps were moved to produce a 4"×4" stretched film with a biaxial stretch ratio of 2:1. Properties of these films were determined as discussed below and are presented in Tables I–III.

MVTR, the moisture vapor transmission rate, as measured in grams per square meter per 24 hours, was determined according to ASTM E-96, procedure E (90% relative humidity, 100° F.) for all samples. The weight % of polymer extracted was determined as the weight differential between the starting film and the extracted film. The film thickness was determined by measuring the film with a micrometer. The porosity of the film was determined by calculating the porosity from the equation porosity (%)=$(dp-d)/dp$ times 100.0 where d is the measured film density in g/cm$^3$ and dp is the density of polypropylene taken as 0.905 g/cm$^3$.

TABLE I

| Sample | Extraction Temperature, °C. | Extraction Time, min. | Weight % Polymer Extracted |
|---|---|---|---|
| A | 90 | 1.5 | 24.2 |
| B | 90 | 4.0 | 24.6 |
| C | 90 | 8.0 | 29.4 |
| D | 91 | 1.5 | 22.6 |

TABLE II

| Sample | Film Density, g/cm$^3$ | MVTR (g/m$^2$/24 hr) | Porosity, % | Film Thickness, mils |
|---|---|---|---|---|
| A | 0.636 | 1617 | 29.8 | 3.1 |
| B | 0.634 | 2387 | 29.9 | 3.1 |
| C | 0.605 | 3321 | 33.0 | 3.1 |
| D | 0.310 | 4125 | 65.7 | 1.7 |

TABLE III

| Sample | Film Density, g/cm$^3$ | Average Pore Size, microns Volume | Average Pore Size, microns Range | Porosity, % |
|---|---|---|---|---|
| A | 0.69 | 0.36 | 0.12–0.51 | 23.6 |
| B | 0.73 | 0.28 | 0.12–0.51 | 27.0 |
| C | 0.65 | 0.57 | 0.15–1.75 | 28.2 |
| D | 0.30 | 3.16 | 0.40–7.6 | 66.7 |

EXAMPLE II

Samples, E, F and G with properties given in Table IV were prepared from the polypropylene-based resin and the procedures given in Example I.

Sample E was an unoriented film prepared using a nucleant level of 1.25 ppm of Q-dye.

Sample F was an unoriented film prepared using a nucleant level of 1.75 ppm of Q-dye.

Sample G was an unoriented film prepared using a nucleant level of 1.75 ppm of Q-dye and 23% masterbatch of ALBIS ECOSTAR ™ Masterbatch PE-Starch MB 70/43/6 which gave a final starch concentration in the unextracted film of 10%.

TABLE IV

| Sample | Extraction Temperature, °C. | Extraction Time, min. | Weight % Polymer Extracted | MVTR g/m$^2$/24 hr |
|---|---|---|---|---|
| E | 87 | 3.0 | 1.1 | 178 |
| E | 89 | 3.0 | 14.1 | 296 |
| E | 91 | 3.0 | 18.9 | 417 |
| E | 93 | 3.0 | 27.2 | 3565 |
| F | 87 | 3.0 | 1.1 | — |
| F | 89 | 3.0 | 14.1 | — |
| F | 91 | 3.0 | 18.9 | 417 |
| F | 93 | 3.0 | 27.2 | 3000 |
| G | 85 | 3.0 | 21.6 | 2065 |
| G | 87 | 3.0 | 29.9 | 3480 |
| G | 89 | 3.0 | 34.1 | 4962 |

EXAMPLE III

Samples H and J with properties given in Table V were prepared from the polypropylene-based resin and procedures given in Example I.

Sample H films were prepared from a polypropylene-based resin containing 1.25 ppm Q-dye. Extractions were done in xylene for three minutes and the oriented film was biaxially oriented at a stretch ratio of 2:1.

Sample J films were prepared from a polypropylene-based resin containing 1.25 ppm Q-dye. Extractions were done in toluene for three minutes and the oriented film was biaxially oriented at a stretch ratio of 2:1.

TABLE V

| Sample | Extraction Temperature, °C. | Weight % Polymer Extracted | MVTR (g/m²/24 hr) unoriented | oriented |
| --- | --- | --- | --- | --- |
| H | 91 | 7.5 | 41 | 326 |
| H | 94 | 15.6 | 607 | 3864 |
| H | 96.1 | 22.7 | 2039 | 4912 |
| H | 95.1 | 20.3 | 1240 | 4361 |
| H | 96.8 | 23.4 | 3285 | 5101 |
| J | 85.8 | 6.9 | 34 | 214 |
| J | 87.1 | 10.4 | 163 | 1204 |
| J | 88.1 | 14.5 | 177 | 1310 |
| J | 91.1 | 23.3 | 2654 | 4689 |
| J | 92.0 | 27.1 | 2303 | 4960 |
| J | 93.1 | 24.9 | 3048 | 5323 |

EXAMPLE IV

Samples K, L, M, N, P and Q were prepared with the polypropylene based resin and procedures similar to Example I. The tensile strength, and ultimate elongation are given in Table VI.

Sample K is an unoriented film prepared from a polypropylene-based resin containing 1.25 ppm Q-dye extracted in toluene at a temperature of 91° C. for 5 minutes with 19.8 wt. % polymer extracted.

Sample L is an unoriented film prepared from a polypropylene-based resin containing 1.75 ppm Q-dye extracted in toluene at a temperature of 89° C. for 5 minutes with 15.4 wt. % polymer extracted.

Sample M is an unoriented film prepared from a polypropylene-based resin containing 1.75 ppm Q-dye and 23% of ALBIS ECOSTAR ™ Masterbatch PE-Starch MB 70/43/6 for a starch concentration of 10% in the film before extraction. The film was extracted in toluene at 87° C. for 7 minutes with 33.3 wt. % polymer extracted.

Sample N is a biaxially oriented film which was prepared from a polypropylene-based resin containing 1.0 ppm Q-dye, extracted in toluene at a temperature of 91.5° C. for 10 minutes with 22.4 wt. % of polymer extracted. The biaxial stretch ratio was 2:1 in both the machine and transverse directions.

Sample P is a biaxially oriented film which was prepared from a polypropylene-based resin containing 2.5 ppm Q-dye, extracted in toluene at a temperature of 91° C. for 10 minutes with 17.2 wt. % of polymer extracted. The biaxial stretch ratio was 2.5:1 in both the machine and transverse directions.

TABLE VI

| Sample | Orientation | Stretch Ratio | Tensile Strength, psi | Ultimate Elongation, % |
| --- | --- | --- | --- | --- |
| K | No | — | 1731(144) | 15.4 (2.5) |
| L | No | — | 2092(125) | 22.1 (4.0) |
| M | No | — | 996(129) | 27.1 (9.9) |
| N | Biaxial | 2:1 | 2337 | 30.5 |
| P | Biaxial | 2.5:1 | 3215 | 22.3 |

Tensile measurements were performed according to ASTM D-1708 using (micro T) bars cut parallel to the machine direction of the film. Tests were performed on 5 specimens of each sample at a crosshead speed of 2"/min with standard deviations given in parentheses.

We claim:

1. An oriented polymeric porous film with polygonal cells having average diameters of about 5 to about 30 microns and interconnecting pores between the cells having average diameters of about 0.2 to about 20 microns prepared from a polypropylene-based resin having at least 40% crystallinity by a process comprising the steps of:
   (a) dispersing in said polypropylene-based resin a nucleating agent capable of producing beta-spherulites;
   (b) extruding the nucleating agent-containing polypropylene-based resin into a film;
   (c) cooling said film below the crystallization temperature of said polypropylene-based resin to form at least 20 weight percent of beta-spherulites in the film;
   (d) extracting selectively said beta-spherulites in an amount corresponding to at least 15 weight percent of the polypropylene-based resin from the cooled film with an extraction solvent to form a porous film; and
   (e) orienting the porous film by heating the porous film at a temperature of about 115° to about 135° C. for a time period of about 2 to about 20 seconds and stretching the heated porous film in at least one direction at a stretch ratio of about 1.5 to about 7.5 to form said oriented polymeric porous film.

2. The oriented polymeric porous film of claim 1 wherein said nucleating agent has the structural formula:

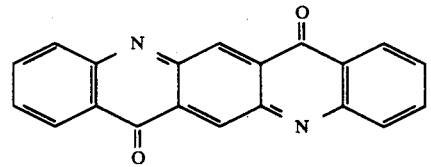

3. The oriented polymeric porous film of claim 2 wherein said nucleating agent is dispersed in the polypropylene-based resin at a level of about 0.1 to about 10 ppm based on the weight of said resin.

4. The oriented polymeric porous film of claim 1 wherein said extracting solvent is selected from the group consisting of toluene, carbon tetrachloride or xylene.

5. The oriented polymeric porous film of claim 1 wherein said polypropylene-based resin contains about 5 to about 15 weight percent cornstarch based on the weight of said resin.

6. The oriented polymeric porous film of claim 1 wherein said step of extracting selectively said beta-spherulites from the cooled film is at a temperature of about 85° to about 95° C. for a time period of 10 minutes or less.

7. The oriented polymeric porous film of claim 5 wherein said step of extracting selectively said beta-spherulites from the cooled film is at a temperature of about 85° to about 90° C. for a time period of 10 minutes or less.

8. A process for preparing an oriented polymeric porous film with polygonal cells having average diameters of about 5 to about 30 microns and interconnecting pores between the cells having average diameters of about 0.2 to about 20 microns from a polypropylene-based resin having at least 40% crystallinity comprising the steps of:
(a) dispersing in said polypropylene-based resin a nucleating agent capable of producing beta-spherulites;
(b) extruding the nucleating agent-containing polypropylene-based resin into a film;
(c) cooling said film below the crystallization temperature of said polypropylene-based resin to form at least 20 weight percent of beta-spherulites in the film;
(d) extracting selectively said beta-spherulites in an amount corresponding to at least 15 weight percent of the polypropylene-based resin from the cooled film with an extraction solvent to form a porous film; and
(e) orienting the porous film by heating the porous film at a temperature of about 115° to about 135° C. for a time period of about 2 to about 20 seconds and stretching the heated porous film in at least one direction at a stretch ratio of about 1.5 to about 7.5 to form said oriented polymeric porous film.

9. The process of claim 8 wherein said nucleating agent has the structural formula:

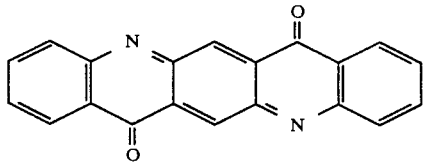

10. The process of claim 8 wherein said nucleating agent is dispersed in the polypropylene-based resin at a level of about 0.1 to about 10 ppm based on the weight of said resin.

11. The process of claim 8 wherein said extracting solvent is selected from the group consisting of toluene, carbon tetrachloride or xylene.

12. The process of claim 8 wherein said polypropylene-based resin contains about 5 to about 15 weight percent cornstarch based on the weight of said resin.

13. The process of claim 8 wherein said step of extracting selectively said beta-spherulites from the cooled film is at a temperature of about 85° to about 95° C. for a time period of 10 minutes or less.

14. The process of claim 8 wherein the porous film is oriented by stretching the porous film uniaxially with a stretch ratio of about 2.0 to about 6.0.

15. The process of claim 8 wherein the porous film is oriented by stretching the porous film biaxially with a stretch ratio of about 2.0 to about 5.0 said stretch ratio being the same in a machine direction and a transverse direction.

16. The process of claim 8 wherein said oriented film has a thickness of about 0.005 to about 0.2 millimeters.

17. An oriented polymeric porous film having a thickness of about 0.005 to about 0.2 millimeters, a moisture vapor transmission rate as determined according to ASTM E-96, procedure E, in the range of about 2,500 to about 7,500 grams per square meter per 24 hours prepared from a polypropylene-based resin having at least 40% crystallinity by a process comprising the steps of:
(a) forming a homogeneous blend of a polypropylene-based resin, about 0.5 to about 10 ppm of a red quinacridone dye acting as a beta-spherulite nucleant and optionally a starch-containing material;
(b) extruding the blend into a film having a thickness of about 0.01 to about 0.4 millimeters and at least 20 percent beta-spherulites on a cast film line having a chill roll temperature of about 90° to 130° C.;
(c) extracting beta-spherulites corresponding to at least 15 weight percent of the blend from the cast film by immersing the cast film in a toluene bath at a temperature of about 85° to about 95° C. for a time period of 10 minutes or less to form a porous film;
(d) drying the porous film at a temperature of about 15° to about 110° C. for 20 minutes or less; and
(e) orienting the porous film by heating the porous film at a temperature of about 115° to about 135° C. for a time period of about 2 to about 20 seconds and stretching the heated porous film in at least one direction at a stretch ratio of about 1.5 to about 7.5 to form the oriented polymeric porous film.

* * * * *